July 11, 1961 F. STERZER 2,992,398

PARAMETRIC OSCILLATOR PHASE SWITCHING MEANS

Filed Jan. 15, 1959 2 Sheets-Sheet 1

INVENTOR.
FRED STERZER

BY Milton S. Winters

ATTORNEY

July 11, 1961 F. STERZER 2,992,398

PARAMETRIC OSCILLATOR PHASE SWITCHING MEANS

Filed Jan. 15, 1959 2 Sheets-Sheet 2

INVENTOR.
FRED STERZER
BY
Milton S. Winters
ATTORNEY

United States Patent Office 2,992,398

Patented July 11, 1961

2,992,398

PARAMETRIC OSCILLATOR PHASE SWITCHING MEANS

Fred Sterzer, Monmouth Junction, N.J., assignor to Radio Corporation of America, a corporation of Delaware Filed Jan. 15, 1959, Ser. No. 787,019

10 Claims. (Cl. 331—55)

This invention relates to switching systems, and particularly to switching systems using nonlinear reactance elements.

It is known that parametric subharmonic oscillations can be established in a resonant circuit using a nonlinear reactance when this reactance is energized by a radio-frequency signal source, or a pump. This nonlinear reactance may be magnetic, such as a ferromagnetic core, or may be capacitive such as a ferroelectric condenser, a variable-capacitance diode, and so on. When the subharmonic oscillations occur at one-half the pump frequency, then the oscillations may exist in either one of two distinct phases. Thus, the circuit is a bistable one with respect to the phase of oscillations. The two phases are used to represent the binary information signals, "1" and "0" which are used in digital computers, for example.

In digital computers, these binary information signals are required to pass through many transmission devices. This results in signal attenuation, and amplifier stages are therefore periodically required to regenerate the signals. In high speed computers, simple and reliable amplifiers capable of amplifying the two phase signals are desirable.

In other computer applications, it is also desirable to provide bistable circuits with gain that can be simply and reliably switched from one stable state to the other each time an input signal is received. For example, in scaling and counting circuits, in triggerable flip-flop circuits and so on. Each input signal causes the signal to reverse its present state.

An object of the present invention is to provide improved bistable circuits with gain which are triggerable from one stable state to the other stable state in a simple and reliable manner.

A further object of the present invention is to provide improved methods of and apparatus for switching the phase of oscillations of a parametric oscillator circuit.

Still another object of the present invention is to provide novel methods of and apparatus for changing the phase of a parametric oscillator circuit.

Yet another object of the present invention is to provide a novel amplifier for two phase signals.

According to the present invention, a parametric oscillator circuit which can oscillate in either of two opposite phases at one frequency is switched from one phase to an opposite phase by increasing the power output from the oscillator circuit at the one phase to a level where the circuit can no longer sustain oscillations. The circuit thereupon switches to the opposite phase.

Figure 1:
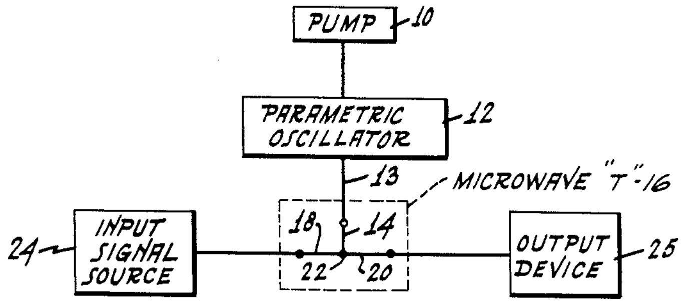
FIGURES 1 and 2 are block diagrams illustrating embodiments of the present invention.

FIGURE 1 shows in block form a system for rapidly switching the phase of a parametric oscillator in accordance with the present invention. A pump 10 is connected with a parametric oscillator 12 to supply driving power thereto. The parametric oscillator 12 preferably operates at a frequency which is one-half the pump frequency. An output signal is derived from the parametric oscillator 12 and is connected by a transmission line 13 to a center arm 14 of a microwave —"T" 16. The microwave —"T" includes in addition to the center arm 14 an input arm 18 and an output arm 20. The center arm 14 connects with the input and output arms at a common junction 22.

One type of microwave —"T" suitable for use in this system is designated UG–28A–U, and is manufactured by the Amphenol Electronics Corporation, Chicago, Illinois. A microwave —"T" made in strip transmission line form is also suitable. Strip transmission line is discussed hereinafter. An input signal source 24 is connected to the input arm 18 of the microwave —"T" 16 and supplies switching signals thereto. An output device 25, which may be a logic circuit in a digital computer, for example, is connected with the output arm 20 of the microwave —"T" 16 to obtain output signals therefrom.

Consider first the operation of the parametric oscillator 12. The parametric oscillator 12 consists essentially of a resonant tank circuit comprising an inductance and capacitance tuned to a frequency, say $f_1$. Either the inductance or the capacitance may be made to vary at another frequency, say $f_2$, by a radio-frequency energizing source or a pump. If the frequency of the pump source is $2f_1$, for example, an effective negative resistance at the frequency $f_1$ appears in the tank circuit and it starts to oscillate parametrically at this frequency. The parametric oscillations are "locked" in phase to the oscillations of the pump. Furthermore, the oscillations occur only in either one of two possible phases 180° apart. Once the circuit starts to oscillate in either one of these two phases, it continues to do so until forcibly stopped or changed.

In a parametric oscillator, as in any oscillator, oscillations occur only as long as sufficient power is generated to overcome circuit losses and, at the same time, provide the power that is transmitted to an external circuit. If an oscillator is heavily loaded, or, in other words, required to deliver so much power to an external circuit that it cannot overcome its own losses, it ceases oscillating.

These principles are used in the novel circuit of FIGURE 1. To switch the phase of the parametric oscillator 12 from one phase to an opposite phase, the circuit loading is first adjusted so that the oscillator sustains oscillations with a given power input. A preferred method of adjusting the loading in a particular embodiment of a parametric oscillator circuit is described hereinafter. The loading of one phase of oscillation is now increased beyond a critical value, whereupon the parametric oscillator 12 ceases oscillations. On resumption of oscillations, the oscillator switches to its other possible phase of oscillation. That is, at one phase of oscillation, the power output from the oscillator is increased to a level where it is no longer able to sustain oscillation, and oscillations resume in another, opposite phase wherein oscillations are sustained.

Additional loading at one phase of oscillation is achieved by use of the microwave —"T" 16 and the input signal source 24. The input signal source 24 is arranged to supply a signal to the junction 22 in the microwave —"T" 16 equal both in frequency and in phase to the output signal from the parametric oscillator 12. Under this condition, the power output from the parametric oscillator 12 increases. Similarly, if the phase of the input signal at the junction 22 is in phase opposition to the parametric oscillator output signal at the junction 22, then the power output from the parametric oscillator decreases.

Though not intended to be limited thereby, an explanation for this action has been proposed. The two input signals applied to the microwave —"T" 16 set up electric fields therein. If the signals are made the same in phase at the junction 22, then the electric fields add vectorially. The power output from the microwave —"T" then becomes proportional to the sum of the electric fields squared, and is greater than the power that would result if each input were applied separately and the total power added at the output. Thus, if signal power input from one source is applied to an arm of a microwave —"T," and another signal is then applied to another arm of the microwave —"T" to add in like phase, the signal power input from the one source is increased.

It has also been found that the change in power output from the parametric oscillator 12 is a function of the magnitude of the power input supplied to the microwave —"T" 16 from the input signal source 24. That is, the greater the power input from the signal source 24, the greater the change in power output from the parametric oscillator 12. Therefore, by making the phase of the input signal at the junction 22 of the microwave —"T" 16 equal to the phase of the signal from the parametric oscillator 12, and by increasing the input power from the signal source, the power output from the parametric oscillator 12 increases. Therefore, increasing the input signal power beyond a critical level causes the parametric oscillator power output to increase to a level where it cannot sustain its own oscillations in this one phase.

If the input signal source is a second parametric oscillator, such as might be used in a digital computer for example, and the input signal from this second parametric oscillator alternates in phase, then the parametric oscillator 12 will follow the input signal phase alterations.

Although there is a minimum power input required from the input signal source 24 before switching occurs, it has been discovered that the input signal power required is several db below the output power from the parametric oscillator 12. Thus, the system shown in FIGURE 1 acts as an amplifier, wherein the output signal is a higher power replica of the input signal, and the first oscillator acts as the power source.

Figure 2:
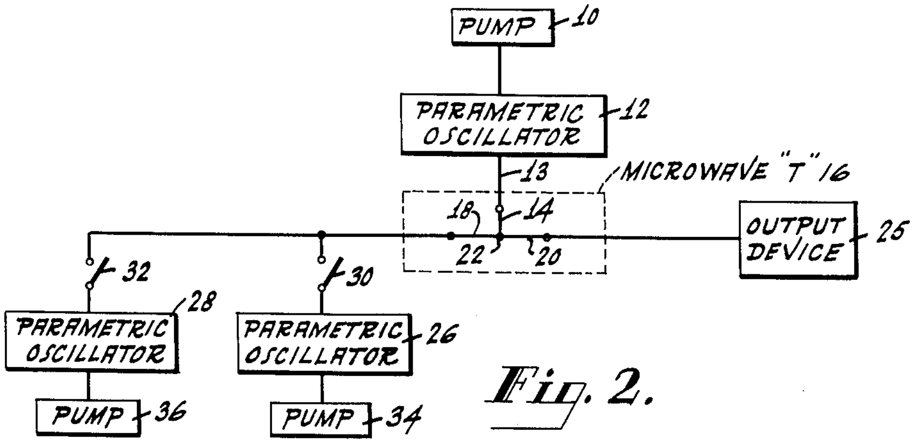

FIGURE 2 illustrates another switching system in which a parametric oscillator 12 may be switched, as desired, into either one of its two possible phases of oscillation. The system is similar to that shown in FIGURE 1 except that a pair of parametric oscillators 26 and 28 are each connected through switches 30 and 32, respectively, to the input arm 18 of the microwave —"T" 16. The parametric oscillators 26 and 28 are energized by pumps 34 and 36, respectively, synchronized with the first pump 10. A single high power pump source may replace the three individual synchronized pumps, if desired.

If the parametric oscillators 26 and 28 are now arranged to oscillate at opposite phases, then the phase of the output signal from the parametric oscillator 12 can be determined by momentarily closing either one or the other of the switches 30 or 32. For example, suppose that the parametric oscillators 12 and 26 both deliver a signal of the same phase to the junction 22 of the microwave —"T" 16. If the power output of the parametric oscillator 26 is above the critical level described heretofore, then by momentarily closing the switch 30 the parametric oscillator 12 switches to an opposite phase. In a similar manner, by next momentarily closing the switch 32, the parametric oscillator 12 switches back to its original phase.

Figure 3:
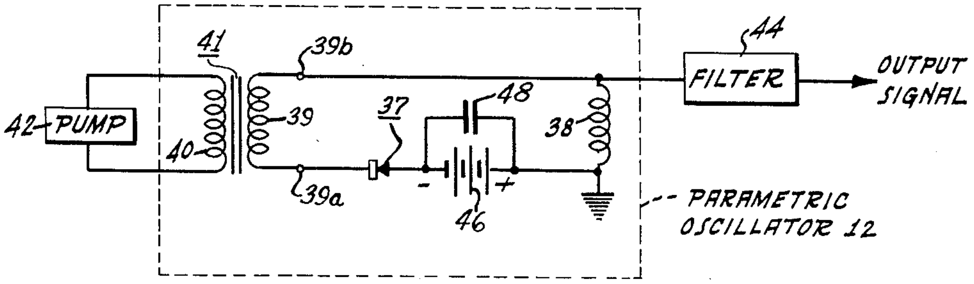
FIGURE 3 is a schematic diagram of one form of parametric oscillator circuit useful in practicing the present invention.

A schematic diagram of one form of a parametric oscillator circuit using a nonlinear reactance device connected in tuned circuit relation with a linear reactance element and suitable for use in the present invention is shown in FIGURE 3. The nonlinear reactance may be a magnetic core, or, as shown in FIGURE 3, a variable-capacitance diode 37. The diode 37 may be a junction diode which exhibits a variable capacitance when suitably biased. The diode 37 has its cathode connected to one terminal 39*a* of a secondary winding 39 on an input transformer 41. The anode of the diode is connected to a reverse-bias source such as battery 46. The positive terminal of the battery 46 is connected to a common point of reference potential indicated in the drawing by a conventional ground symbol. A bypass capacitor 48 is connected across the terminals of the battery 46 to prevent the loss of signal voltage across the battery 46 impedance. The linear reactance in the circuit of FIGURE 2 is provided by an inductor 38 having one terminal thereof connected to a second terminal 39*b* on the secondary winding 39 of the input transformer 41 and the other terminal of the inductor 38 is connected to ground. Pump signals are applied to the oscillator circuit by means of the transformer 41 which has its primary winding 40 connected to the output of a pump source 42. A filter 44 is connected with the ungrounded end of the inductor 38 to prevent signal components at the pump frequency from reaching the output.

In operation, application of pump signals of sufficient amplitude to the parametric oscillator circuit causes the circuit to begin oscillating at one-half of the supply frequency and in either one or the other of two opposite phases.

Figure 4:
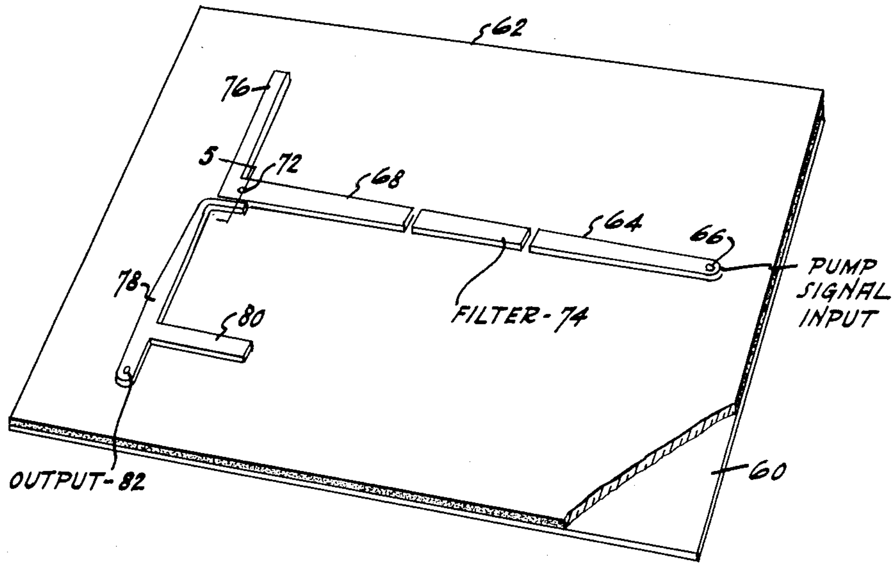
FIGURE 4 is a perspective view of a preferred parametric oscillator for practicing the present invention.

FIGURE 4 illustrates, in perspective, a preferred type of parametric oscillator suitable for use with the present invention. The components are of so-called strip transmission line construction. Such strip transmission lines may be constructed by employing a metal ground plate 60, which may be copper, applied as a backing on one surface of a suitable dielectric material 62. On the other surface of the dielectric 62 are strips of copper which may be established by printed circuit etching or plating techniques to form the desired circuit. A transmission line is formed between such as strip of copper and the spaced ground plate 60. The input from the pump may be coupled to a section 64 of strip transmission line at a point 66 from another transmission line (not shown), such as a coaxial line, by means of a known type of transducer. A suitable transducer for this purpose is described in the copending application of Donald J. Blattner and Fred Sterzer, Serial No. 760,225, filed September 10, 1958, for "Logic Circuits," and assigned to the assignee of the present invention. As described in this copending application, these transducers preferably include an outer conductor connected to the ground plate and an inner conductor which passes through an aperture in the ground plate to make connection with the strip transmission line, as at the point 66.

Figure 5:
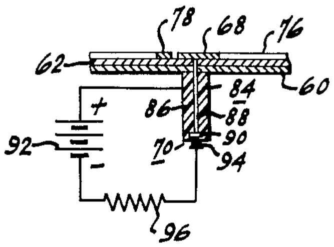
FIGURE 5 is a cross-sectional view of a detail of FIGURE 4 taken along the line 5—5 of FIGURE 4 and showing certain circuit components connected thereto.

The parametric oscillator circuit comprises a section 68 of strip transmission line and a voltage-sensitive, variable-capacitance diode 70 mounted at 72, in the manner illustrated in FIGURE 5. The diode 70 and its associated section 86 of strip transmission line form a tank circuit. Although the parameters may be adjusted so that parametric oscillations will be sustained at any of the permissible frequencies, we prefer to operate the circuit at one-half the pump frequency. A section 74 of strip transmission line is inserted between the oscillator section 68 and the section 64 to which the pump signal is coupled. The section 74 is preferably one-half wavelength at the pump frequency and serves as a filter which passes the pump signal to the oscillator and prevents signals at the oscillator frequency from being fed back to the pump. A D.C. return for the parametric oscillator diode to ground is provided by a section 76 of strip transmission line which is approximately one-quarter wavelength at the oscillator frequency, and has its end remote from the diode 70 short-circuited to the ground plate 60.

The coupling for the ouput is in the form of a tapered section 78 of strip transmission line which tapers down to a very small fraction of the normal width of the strip conductor and approaches within perhaps 0.02 inch of the diode end of the section 68. The tapering affords impedance matching. Coupling or loading of the oscillator may be decreased by shaving off part of the end of the coupling section 78, or increased by connecting a wire on the surface of the coupling section 78 to approach nearer the diode resonator. By varying the coupling in this manner, the loading of the oscillator may also be adjusted to provide the type of circuit operation described heretofore in accordance with the invention. A filter is provided to remove signal components at the pump frequency from the output. Such a filter may be an open-circuited stub 80, which is one-quarter wavelength at the pump frequency and grounded at its outer end. A suitable transducer may be connected, for example, at the point 82, if it is desired to transmit the output over a coaxial transmission line. Such a transducer may be of the type described in the aforementioned co-pending application.

FIGURE 5 illustrates the manner in which the diode 70 may be inserted into the circuit. A transducer 84 includes an outer conductor 86 connected to the ground plate 60, and an inner conductor 88 which passes through an aperture in the ground plate to make connection to the section 68 of strip transmission line. Suitable impedance matching may be provided. The transducer 84 may have a mounting at its termination for the variable-capacitance diode 70. The cathode 90 of the diode is connected to the inner conductor 88. The diode is back-biased by a suitable biasing source, such as by a battery 92. The positive terminal of the battery is connected to the outer conductor 86 of the transducer 84, and the negative terminal of the battery 92 is connected to the anode 94 of the diode through a resistor 96. The diode 70 and battery 92 may be reversed, if desired.

There has been described herein a novel system for switching the phase of oscillation of a parametric oscillator. The system uses simple circuit techniques and has the additional advantage of providing a bistable circuit with power gain. A circuit of this type is well suited for use in logic circuits in digital computers, for example.

What is claimed is:

1. A system comprising a parametric oscillator circuit, said circuit having different phases of oscillation at the same frequency, said circuit being capable of oscillating in any one phase when the power output is below a critical predetermined value at said one phase, and means for increasing selectively the power output above said critical value, whereby the phase of oscillations is switched from said one phase to another of said phases.

2. A system comprising a parametric oscillator circuit capable of representing the two binary digits by two different phases of oscillation at one frequency, said circuit oscillating at one of said phases when pump signals are applied to said oscillator, means for deriving signal power from said circuit, and means for increasing beyond a critical value the power transferred to said external circuit at said one of said phases whereby said parametric oscillator can only sustain oscillations at the other of said phases.

3. In a switching system, the combination of a parametric oscillator circuit having two distinct phases of oscillations at the same one frequency when pump signals are applied to said circuit, means for applying said pump signals to said oscillator, and means causing said parametric oscillator to increase beyond a critical value its power output at the phase of oscillation whereby said parametric oscillator resumes oscillation in the other of said two phases.

4. A system comprising a parametric oscillator circuit wherein the two binary digits are represented respectively by two different phases of oscillation at the same frequency, means for coupling pump signals to said circuit, and means for loading down the circuit at the one of said two phases in which said circuit is oscillating, whereby the oscillations in said parametric oscillator switch to the other of said two phases.

5. In a system comprising a parametric oscillator circuit, said circuit oscillating at one or the other of two phases at the same one frequency, means for deriving signal power from said parametric oscillator circuit, and means for momentarily increasing the power output of said parametric oscillator at the phase of oscillation to a level whereby said parametric oscillator switches to the other of said phases of oscillation.

6. A system comprising a parametric oscillator circuit wherein the two binary digits are represented respectively by two phases of oscillation of said circuit, means for applying pump signals to said circuit, means for adjusting the loading of said oscillator to a value whereby said parametric oscillator just sustains oscillations, and means for momentarily increasing said loading whereby said parametric oscillator switches phase.

7. In combination, a parametric oscillator circuit capable of oscillating at any of a plurality of distinct phases at one frequency, said circuit being capable of sustaining oscillations in any one phase when the power output from said oscillator at said one phase is below a critical value, a microwave "T" having an input arm, an output arm, and a center arm forming a junction with said input arm and said output arm, means coupling an output signal from said oscillator to said center arm, an output device connected at said output arm, and means for applying at said input arm a signal which has the same frequency and phase at said junction as said output signal and which has an amplitude sufficient to increase said power output above said critical value.

8. In combination, a first parametric oscillator having two possible phases of oscillation at the same frequency, said first oscillator being capable of sustaining oscillations in any one of said phases when the power output of said first oscillator at said one of said phases is below a critical value; a microwave "T" having an input arm, an output arm, and a center arm forming a junction with said output arm and said input arm; means coupling an output signal from said first oscillator to said center arm; an output device connected at said second arm; a second oscillator for supplying at said junction a signal having the same frequency and phase as said output signal and an amplitude sufficient to increase the power output of said first oscillator above said critical value; a third oscillator for supplying at said junction a signal having the same frequency as said output signal and of different phase; and means for connecting at will a selected one of said second and said third oscillators to said input arm.

9. The combination set forth in claim 8 wherein said second and third oscillators are parametric oscillators.

10. The combination comprising a parametric oscillator capable of oscillating in either of two distinct phases at the same frequency when the loading on said oscillator is less than a critical value, and means selectively operable to exceed said critical value of loading at the phase of oscillation, whereby said oscillations are switched to the other of said two phases.

References Cited in the file of this patent

UNITED STATES PATENTS 2,623,176 Witsenburg et al. ------- Dec. 23, 1952

FOREIGN PATENTS 778,883 Great Britain ------------ July 10, 1957